United States Patent Office 3,428,882
Patented Feb. 18, 1969

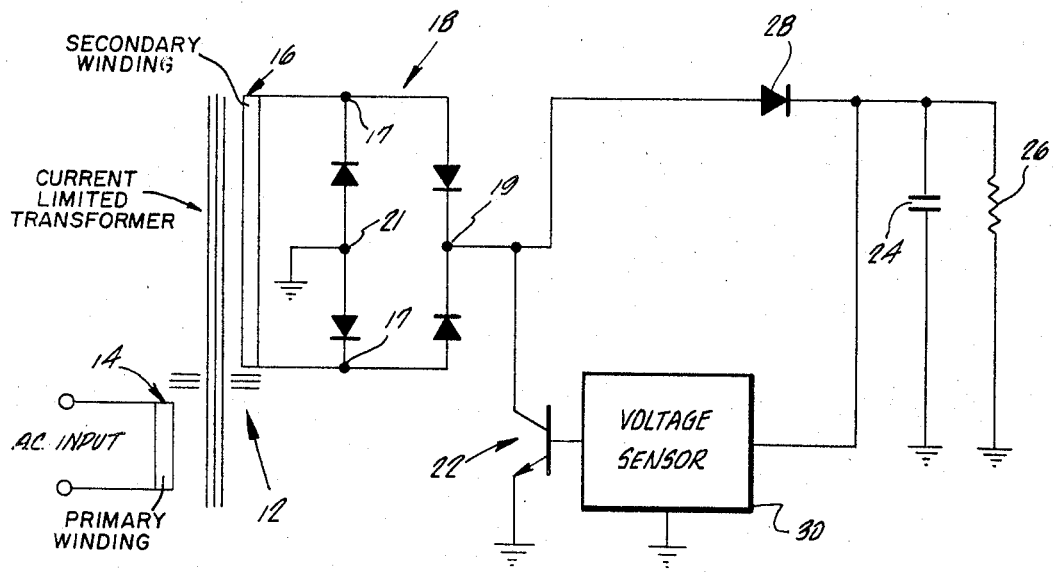
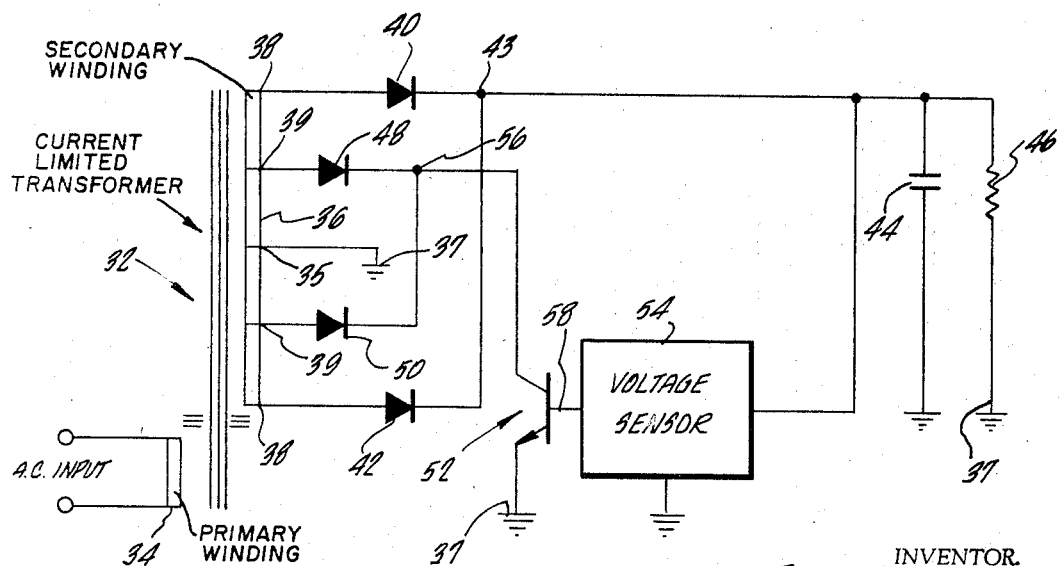

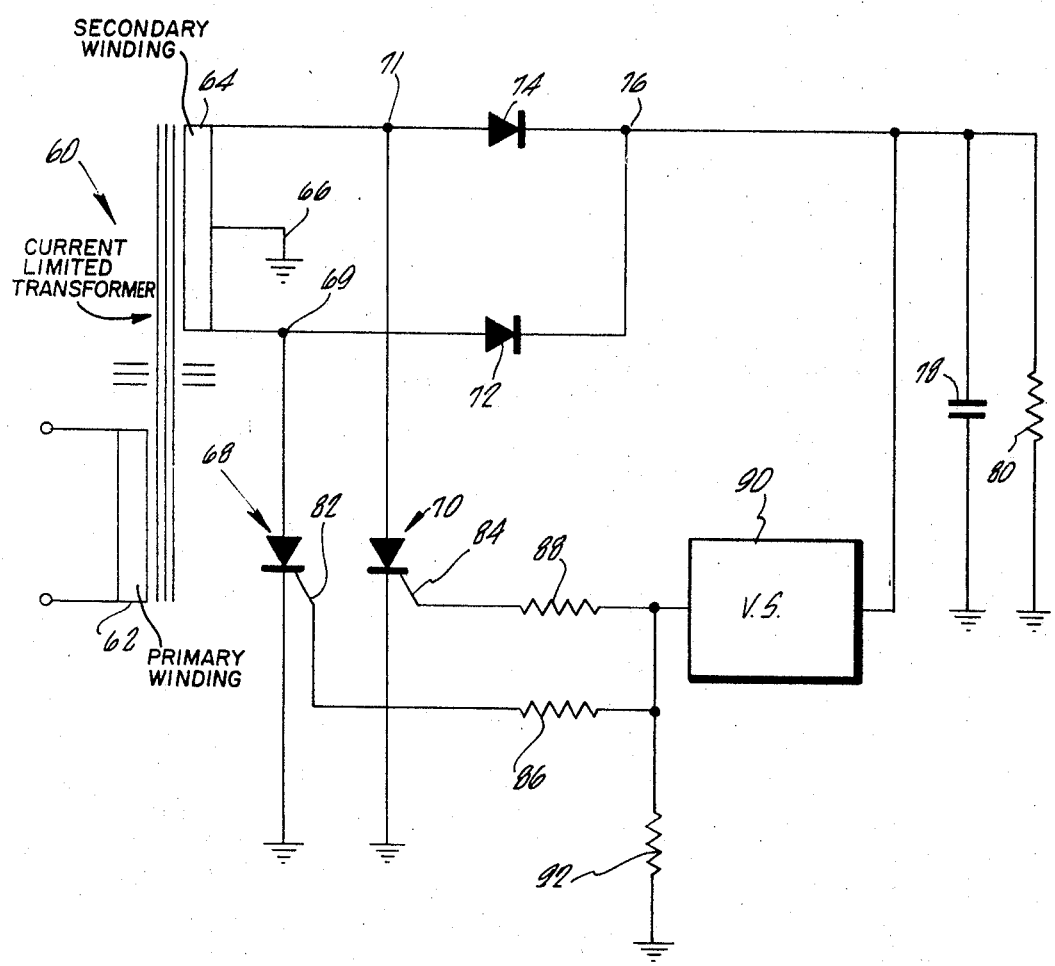
FIG_3

3,428,882
SHUNT-SWITCHING VOLTAGE REGULATED
POWER SUPPLY
John A. Gilbert, Upland, Calif., assignor to Unitek Corporation, Monrovia, Calif., a corporation of California
Filed Aug. 23, 1965, Ser. No. 481,562
U.S. Cl. 321—18                  20 Claims
Int. Cl. G05f 1/38; H02m 5/12

ABSTRACT OF THE DISCLOSURE

A regulated DC power supply utilizing a switching element connected in parallel circuit relationship with the supply load and a voltage sensor for providing the regulating function. The power supply utilizes a transformer having a current-limited secondary winding with the switching element being arranged to provide a "short circuit" across the terminals of the secondary winding when the voltage supplied to the load exceeds the regulation level.

---

This invention relates to voltage regulated power supplies and in particular to a power supply utilizing a shunt-switching device for obtaining voltage regulation.

At present, there are three well known types of power supplies or regulators for providing a regulated D.C. voltage from an A.C. power source. These three types of supplies are shunt, series, and switching voltage regulators so designated because of the manner in which regulation is obtained by each type.

The shunt voltage regulator utilizes an active regulating element in parallel with a load and bypasses or "shunts" current around the load to achieve a constant voltage across the load. This type of regulator also requires that the unregulated power source have a relatively high source impedance or that an impedance be added to the circuit in series with the source and the load. Any change in voltage at the source produces a change in the current through the regulating element such that the voltage across the element and the load remains substantially the same.

The series type of voltage regulator utilizes a regulating device in series with the source of A.C. power and the load. It operates on the principle that variations in the voltage of the source about the operating point of the regulating device will produce a compensating increase or decrease in the potential difference across the regulating device thereby providing that the difference of potenial at the output terminals of the supply remains essentially constant.

A shunt voltage regulator is inefficient when used with relatively small loads because a substantial amount of power is drawn by the voltage regulating device. The efficiency of the series voltage regulator is substantially greater than the shunt voltage regulator for small loads and the efficiency of the two are comparable and relatively high for large loads. The series voltage regulator does suffer from the disadvantage that, under substantial overload condition, the regulating device is subject to failure due to overload unless steps are taken to provide overload safeguards.

The third type of voltage regulator, the switching regulator, provides one or more switching means in series between the source and the load. The duration of conduction of the switching means during each cycle of A.C. input controls the output voltage. The switching regulator has an efficiency approaching 100% because of the limited conduction of the switching means and the use of means which dissipate small amounts of power in both the conducting and nonconducting states.

In normal operation where line voltage variations and transient voltage conditions are to be encountered during operation of the power supply, series-switching regulators employing a single switching element are limited to line voltage levels of one-third to one-half the breakdown voltage of the switching device. Voltage supplies in which it is desired to regulate voltages of more than one-half of the switching device breakdown voltage must be designed by cascading or "series stacking" the switching devices until the desired voltage breakdown characteristic is obtained. Cascaded regulating elements, however, require dynamic and static balancing with suitable passive circuit elements thereby adding to the cost and circuit complexity of the regulated supply. Such regulators are also subject to failure in the event of substantial overload.

The present invention provides a regulated D.C. power supply utilizing a current limited transformer and a switching device placed in parallel with a load. The switching device intermittently applies a short circuit to the current-limited secondary winding of the transformer to achieve regulation. The invention comprises a transformer having a primary winding and a current-limited secondary winding. The primary winding is connected to a pair of supply input terminals and the secondary winding is connected to a pair of supply output terminals. Means connected to the secondary winding are provided for monitoring the output from that winding together with means for intermittently applying a short circuit to the secondary winding of the transformer in response to a signal from the monitoring means.

With the regulator of the present invention the switching means need have a maximum rating no higher than the regulated D.C. output voltage of the power supply since no voltage higher than the regulation value can appear across the swiching means. In one embodiment of this invention, the switching means can have a rating substantially lower than the output voltage which it is to control. In addition the shunt switching regulated power supply of this invention eliminates the problems of static and dynamic balancing of a series stack of switching devices and the necessity of providing overload protection for such devices. The high efficiency characteristic of the switching type of regulator is retained. These and other advantages will be more apparent after reference is had to the following figures wherein:

FIG. 1 is a schematic diagram of one embodiment of the invention,

FIG. 2 is a schematic diagram of a second embodiment of the invention, and

FIG. 3 is a schematic diagram of a third embodiment of the invention.

Referring to FIG. 1, the circuit shown therein comprises a current-limited transformer 12 having a primary winding 14 and a current-limited secondary winding 16 connected to the input terminals 17 of a diode rectifying bridge 18. A current-limiting transformer such as that described in Electronic Transformers and Circuits, Reuben Lee, John Wiley & Sons, etc. 2nd edition 1947, pp. 248–9, is suitable. The bridge 18 is provided with a pair of output terminals 19 and 21. Terminal 21 is connected to a common or ground terinal. A switching device 22 is connected across the output terminals of the bridge 18. A filtering capacitor 24 is connected in parallel with a load impedance 26 to be supplied with regulated power. The parallel combination of capacitor 24 and load 26 is connected on one side to bridge terminal 19 by means of a blocking diode 28 and on the other side to the common or ground terminal. The filtering capacitor 24 is provided to reduce the ripple content of the voltage supplied to the load 26. Diode 28 is provided between capacitor 24 and bridge 18 to prevent discharge of the capacitor during those intervals when switching device 22 is operated. A voltage-sensing mechanism 30 is connected in parallel with the load impedance 26 and a connection between sensing mechanism 30 and switching device 22 completes the circuit.

The voltage-sensing mechanism 30 may be of any of a number of conventional bistable voltage-sensitive switching devices such as a Schmitt trigger and a voltage divider network. When the voltage attenuated by the divider network exceeds a predetermined threshold, the Schmitt trigger is operated and it in turn operates the switching device 22. As shown in FIG. 1, the switching device 22 is a transistor. The switching function can also be performed by a number of other devices such as vacuum tubes, relays, gate-controlled switches, photoconductors, silicon-controlled rectifiers, etc.

In operation the circuit performs as follows. With the primary winding 14 connected to a source of A.C. power, the output from the current-limited secondary winding 16 is fed to the diode bridge 18 for rectification and the output therefrom is D.C. This D.C. energy is first transmitted to capacitor 24 which charges the desired regulation voltage level and is then supplied to load 26. As long as the voltage supplied to the load remains below the regulation level, the switching means 22 remains "off" or in the non-conducting state. If the voltage across the load tends to exceed the regulation level, this tendency is detected by the voltage sensor 30 which causes the switching device 22 to turn on or conduct thereby applying a short circuit to the output of the rectifier.

By virtue of the use of the current limited transformer, the action of the switching device 22 in shortening the output of the rectifier does not affect the transformer or other circuit components since even in the shorted condition, the maximum current from the transformer is limited to a certain safe value because of its current limited design. With the switching device in the conducting state, the output of the rectifier is shorted and the voltage applied to the load is zero. The switching device remains "on" until the load voltage drops below the desired regulation level.

The circuit of FIG. 2 is a second embodiment of the regulator of this invention. This circuit comprises a transformer 32 having a primary winding 34 and a center-tapped, current-limited secondary winding 36. A first pair of taps 38 connect the secondary winding to two diodes 40 and 42. The output of diodes 40 and 42 are connected to an output terminal 43 and the center tap 35 of the secondary winding is connected to a common terminal 37 to provide full wave rectification of the output from the secondary winding 36. Terminal 43 is connected to one side of a parallel combination consisting of a load 46 and a filter capacitor 44. The other side of these two circuit elements is connected to the common terminal 37. A first pair of auxiliary taps 39 connect a portion of the secondary winding to a second pair of diodes 48 and 50. The output side of diodes 48 and 50 is connected to an output terminal 56 to provide full wave rectification of the voltage obtained from taps 39. Terminal 56 is connected through a switching device 52 to the common terminal 37. A voltage sensor 54 is connected across the load 46 and a connection 58 between the voltage sensor 54 and switching means 52 provides the means whereby the sensor controls the state of switching device 52. As in FIG. 1, the voltage sensor 54 can be a number of conventional devices for detecting the tendency of the supply to exceed regulation voltage level. Switching device 52 like device 22 of FIG. 1 is also a transistor.

The circuit of FIG. 2 eliminates the blocking diode of FIG. 1 between the load impedance 46 and the secondary winding 36 because in this embodiment diodes 40 and 42 provide the necessary blocking function to prevent the capacitor from discharging through switching device 52 during the conduction periods of this device.

In operation, A.C. power is supplied to the transformer and the voltage on the secondary winding 36 builds up to the desired level. Until the voltage across the load reaches a predetermined level, the regulation voltage value, the voltage sensor 54 is not energized and switching device 52 remains in a nonconductive state. When the output from terminal 43 reaches or exceeds the regulation level, the sensing means 54 is activated and generates a signal which causes the switches device 52 to conduct thereby applying a short circuit to the portion of the secondary winding 36 connected to terminal 56.

Shorting a number of turns less than the total number in the secondary winding has been found to have the same effect on the transformer as if the entire secondary winding were short-circuited, i.e., shunting the number of turns connected through diodes 48 and 50 to terminal 56 makes the entire winding as seen by the load appear to be shunted to ground. As in the circuit of FIG 1, shorting the output of the transformer prevents the output of the power supply from exceeding the regulation level.

When the voltage across the load drops below the regulation level, the voltage-sensing means 54 changes state and power is again supplied to the load until it again succeeds the regulation level. The quality of the regulator, the degree of regulation and the amount of ripple in the output are dependent upon the sensitivity of the voltage-sensing means 54.

A particular advantage of the embodiment in FIG. 2 is that a lower voltage switching device can now be used to obtain the desired voltage regulation. This is especially advantageous in such applications as in welding power supplies. The embodiment of FIG. 2 permits regulation at this voltage level with a transistor, silicon-controlled rectifier or other device having a maximum rating on the order of a fraction of the regulated voltage.

Using the shunt-switching regulator of the present invention also provides the advantage that the regulator is not susceptible to failure due to overload as are the series switching regulators. The shunt regulator also means that it is possible to avoid the problems of balancing a "stack" of voltage control devices frequently required in a high-voltage series type switching regulator.

In FIG. 3, a third embodiment of the power supply of this invention a transformer 60 having a primary winding 62 and a current limited secondary winding 64 is connected to the rest of the circuit in the following manner.

Primary winding 62 is connected to a source of A.C. power. A center tap 66 connected to a common or ground terminal is provided on the secondary winding and a pair of silicon controlled rectifiers (SCR) 68 and 70 are connected to each side of the secondary winding at terminals 69 and 71 respectively. A pair of diodes 72 and 74 are also connected to terminals 69 and 71 respectively and to a common rectifier output terminal 76 to provide a full wave rectification of the output from the secondary winding. A parallel combination of a filter capacitor 78 and a load 80 are connected between terminal 76 and ground.

The cathodes of SCR's 68 and 70 are connected to the ground terminal. The gate electrodes 82 and 84 of SCR's 68 and 70 respectively are connected by means of voltage-dropping resistors 86 and 88 respectively to the output side of a voltage sensor 90. Again sensor 90 can be one of a number of conventional bistable switching devices. A suitable biasing resistor 92 is provided between the output side of sensor 90 and the ground terminal. The input side of sensor 90 is connected to terminal 76 to complete the circuit of this embodiment.

In operation the source of A.C. power supplies electrical energy to the primary winding 62 and a voltage is induced in the secondary winding 64. This induced voltage is rectified and transmitted to capacitor 78. After capacitor 78 charges to the regulation level, energy is supplied to the load 80. As the voltage supplied to the load tends to exceed the regulation level, voltage sensor 90 is operated which in turn transmits a signal to gate electrodes 82 and 84 of the silicon controlled rectifiers.

Since the voltage at terminal 69 is 180° out of phase with that at terminal 71, each SCR is rendered conductive during alternate half-cycles of the voltage induced in secondary winding 64 thereby completely shunting the voltage in the secondary winding to ground. The occurrence of a negative-going signal at terminals 69 and 71 serves to cutoff conduction of the SCR connected to that terminal. As long as the signal from sensor 90 stands on the gate electrodes of the pair of SCR's, they conduct when their respective anodes are positive (positive half-cycle) and shut off when their anodes are negative (negative half-cycle). Since the voltages at terminals 69 and 71 are 180° out of phase, one SCR is conducting while the other is shut off. The operation continues in this manner and the output from the secondary winding is shunted to ground until the voltage at the load drops below the regulation level. When this occurs the voltage sensor 90 changes state removing the signal from gate electrodes 82 and 84. The next negative half-cycle encountered at terminals 69 and 71 cuts off conduction of SCR 68 and 70 respectively and a full wave rectified voltage is transmitted to the load until the voltage at this point again tends to exceed the regulation level.

It is contemplated that among other applications for the regulator of this invention are uses as D.C. laboratory power supplies, fixed equipment D.C. supplies, capacitor discharge welding power supplies, laser pumping power supplies and in general any application where D.C. regulated power is needed from A.C. power sources.

What is claimed is:

1. A regulated D.C. power supply comprising:
   a pair of input terminals,
   a transformer having a primary winding and a current limited secondary winding, the primary winding being connected to the input terminals,
   a pair of output terminals connected to the current limited secondary winding,
   means connected to the secondary winding for monitoring the output from the secondary winding, and
   means connected to the secondary winding for applying a short circuit to the secondary winding in response to the monitoring means.

2. A regulated D.C. power supply comprising:
   a source of A.C. power
   a pair of input terminals connected to the source of A.C. power,
   a transformer having a primary winding and a current limited secondary winding, the primary winding being connected to the input terminals,
   a pair of output terminals connected to the secondary winding,
   means connected to the secondary winding for monitoring the output from the secondary winding,
   a load impedance connected across the output terminals, and
   means connected to the secondary winding for applying a short circuit to the secondary winding in response to the monitoring means.

3. A power supply according to claim 2 wherein the short-circuiting means is a transistor.

4. A power supply according to claim 2 wherein the short-circuiting means is a silicon-controlled rectifier.

5. A power supply according to claim 2 wherein the short-circuiting means is a vacuum tube.

6. A power supply according to claim 2 wherein the short-circuiting means is a relay.

7. A power supply according to claim 2 wherein the short-circuiting means is a photoconductor.

8. A power supply according to claim 2 wherein the short-circuiting means is a gate-controlled switch.

9. A power supply according to claim 2 wherein the short-circuiting means is a pair of silicon-controlled rectifiers.

10. A regulated D.C. power supply comprising:
    a pair of input terminals,
    a transformer having a primary winding and a current limited secondary winding, the primary winding being connected to the input terminals,
    rectifying means having input and output terminals, the input terminals being connected to the secondary winding of the transformer,
    switching means connected across the output terminals of the rectifying means,
    a pair of power supply output terminals connected to the output terminals of the rectifying means,
    voltage-sensing means connected across the power supply output terminals for controlling the state of the switching means, and
    means interconnecting the voltage-sensing means and the switching means.

11. A regulator D.C. power supply comprising:
    a source of A.C. power,
    a pair of input terminals connected to the source of power,
    a transformer having a primary winding and a current limited secondary winding, the primary winding being connected to the input terminals,
    rectifying means having input and output terminals, the input terminals being connected to the secondary winding of the transformer,
    switching means connected across the output terminals of the rectifying means,
    a pair of power supply output terminals connected to the output terminals of the rectifying means,
    a load impedance connected across the output terminals,
    voltage-sensing means connected across the power supply output terminals for controlling the state of the switching means, and
    means interconnecting the switching means and the voltage-sensing means.

12. A regulated D.C. power supply comprising:
    a source of A.C. power,
    a pair of input terminals connected to the source of power,
    a transformer having a primary winding and a current limited secondary winding, the primary winding being connected to the input terminals,
    rectifying means having input and first and second output terminals, the input terminals being connected to the secondary winding of the transformer,
    switching means connected across the output terminals of the rectifying means,
    a power supply output terminal,
    a common terminal, the common terminal being connected to the second output terminal of the rectifying means,
    a capacitive element connected between the supply output terminal and the common terminal,
    a diode for preventing discharge of the capacitive element through the switching means, the first output being connected by means of the diode to the supply output terminal of the rectifying means,
    switching means connected across the output terminals of the rectifying means,
    voltage-sensing means for controlling the state of the switching means connected across the supply output terminal and the common terminal, and
    means interconnecting the voltage-sensing means and switching means.

13. A regulated D.C. power supply comprising:
    a pair of input terminals,
    a transformer having a primary winding, a first and second current limited secondary winding and a center tap, the primary winding being connected to the input terminals, the second secondary winding having a fewer number of turns than the first secondary winding,
    a common terminal, the center tap of the transformer being connected to the common terminal, first rectifying means having an input and an output, the input of the first rectifying means being connected to the first secondary winding for rectifying the output therefrom, second rectifying means having an input and an output, the second rectifying means input being connected to the second secondary winding for rectifying the output therefrom, a pair of output terminals, the first of said output terminals being connected to the output of the first rectifying means, the second of said output terminals being connected to the common terminal, switching means connected across the output of the second rectifying means and the common terminal, voltage-sensing means connected across the pair of output terminals for controlling the state of switching means, and means interconnecting the voltage-sensing means and switching means.

14. A regulated D.C. power supply comprising:
a source of A.C. power,
a pair of input terminals connected to the source of power,
a transformer having a primary winding, a first and second current limited secondary winding and a center tap, the primary winding being connected to the input terminals, the second secondary winding having a fewer number of turns than the first secondary winding,
a common terminal, the center tap of the transformer being connected to the common terminal,
first rectifying means having an input and an output, the input of the first rectifying means being connected to the first secondary winding for rectifying the output therefrom,
second rectifying means having an input and an output, the second rectifying means input being connected to the second secondary winding for rectifying the output therefrom,
a pair of output terminals, the first of said output terminals being connected to the output of the first rectifying means, the second of said output terminals being connected to the common terminal,
a load impedance connected across the pair of output terminals,
switching means connected across the output of the second rectifying means and the common terminal,
voltage-sensing means connected across the pair of output terminals for controlling the state of switching means, and
means interconnecting the voltage-sensing means and switching means.

15. A regulated D.C. power supply comprising:
a source of A.C. power,
a pair of input terminals connected to the source of power,
a transformer having a primary winding, a first and second current limited secondary winding and a center tap, the primary winding being connected to the input terminals, the second secondary winding having a fewer number of turns than the first secondary winding,
a power supply output terminal,
a common terminal, the center tap of the transformer being connected to the common terminal,
first full wave rectifying means having a pair of input terminals and an output terminal, the input terminals being connected across the first secondary winding, the output terminal being connected to the supply output terminal,
a capacitive element connected across the supply output terminal and the common terminal,
second full wave rectifying means having a pair of input terminals and an output terminal, the input terminals being connected across the second secondary winding,
switching means connected between the output terminal of the second rectifying means and the common terminal,
a load impedance connected across the supply output terminal and the common terminal,
voltage-sensing means connected across the supply output terminal and the common terminal for controlling the state of the switching means, and
means interconnecting the switching means and voltage sensing means.

16. A regulated D.C. power supply comprising:
a pair of input terminals,
a transformer having a primary winding,
A current limited secondary winding and a center tap, the primary winding being connected to the input terminals,
a common terminal, the center tap of the transformer being connected to the common terminal,
rectifying means having an input and an output, the input being connected across the secondary winding,
switching means connected between the secondary winding and the common terminal,
a pair of output terminals, the first of said output terminals being connected to the output of the rectifying means, the second of said output terminals being connected to the common terminal,
voltage-sensing means connected across the pair of output terminals for controlling the state of the switching means, and
means interconnecting the voltage sensing means and the switching means.

17. A regulated D.C. power supply comprising:
a source of A.C. power,
a pair of input terminals connected to the source of power,
a transformer having a primary winding,
a current limited secondary winding and a center tap, the primary winding being connected to the input terminals,
a common terminal, the center tap of the transformer being connected to the common terminal,
rectifying means having an input and an output, the input being connected across the secondary winding,
switching means connected between the secondary winding and the common terminal,
a pair of output terminals, the first of said output terminals being connected to the output of the rectifying means, the second of said output terminals being connected to the common terminal,
a load impedance connected across the pair of output terminals,
voltage-sensing means connected across the pair of output terminals for controlling the state of the switching means, and
means interconnecting the voltage-sensing means and the switching means.

18. A regulated D.C. power supply comprising:
a source of A.C. power,
a pair of input terminals connected to the source of power,
a transformer having a primary winding, a current limited secondary winding and a center tap, the primary winding being connected to the input terminals,
a power supply output terminal,
a common terminal, the center tap of the transformer being connected to the common terminal,
full wave rectifying means having a pair of input terminals and an output terminal, the input terminals being connected across the secondary winding, the output terminal being connected to the supply output terminal, a capacitive element connected across the supply output terminal and the common terminal,
a first switching means connected between one side of the secondary winding and the common terminal,
a second switching means connected between the other side of the secondary winding and the common terminal,
a load impedance connected across the supply output terminal and the common terminal,
voltage-sensing means connected across the supply output termianl and the common terminal for controlling the state of the switching means, and
means interconnecting the first and second switching means and the voltage sensing means.

19. The method of producing a regulated D.C. voltage from an A.C. source comprising the steps of:
  (1) applying power from the A.C. source to a transformer having a primary winding and a current-limited secondary winding,
  (2) monitoring the output voltage from the secondary winding,
  (3) applying a short circuit to at least a portion of the secondary winding when the level of the monitored output voltage from the secondary winding exceeds a predetermined value, and
  (4) transmitting the output voltage from the secondary winding to a pair of output terminals.

20. The method of producing a regulated D.C. voltage from an A.C. source comprising the steps of:
  (1) applying power from the A.C. source to a transformer having a primary winding and a current limited secondary winding,
  (2) monitoring the level of the output voltage from the secondary winding,
  (3) rectifying the output voltage from the secondary winding,
  (4) operating switching means connected to the secondary winding to apply a short circuit to at least a portion of the secondary winding when the level of the monitored output voltage from the secondary winding exceeds the desired regulated D.C. voltage level, and
  (5) transmitting the rectified output voltage from the secondary winding to a pair of output terminals.

References Cited

UNITED STATES PATENTS

| | | |
|---|---|---|
| 3,141,124 | 7/1964 | Atherton. |
| 3,246,229 | 4/1966 | Lloyd _____ 31—18 XR |
| 3,260,917 | 7/1966 | Shimwell et al. _____ 321—18 |
| 3,281,638 | 10/1966 | Crawford _____ 320—40 |
| 3,295,053 | 12/1966 | Perrins _____ 323—50 XR |
| 3,302,092 | 1/1967 | Bloom et al. _____ 323—22 |
| 3,312,889 | 4/1967 | Gold _____ 320—36 |
| 3,324,378 | 6/1967 | Kupferberg et al. _____ 321—18 |

JOHN F. COUCH, *Primary Examiner.*

W. SCHOOP, *Assistant Examiner.*

U.S. Cl. X.R.

323—50, 22